(12) United States Patent
Aramaki et al.

(10) Patent No.: US 7,503,509 B2
(45) Date of Patent: Mar. 17, 2009

(54) ANTENNA APPARATUS

(75) Inventors: Keisuke Aramaki, Tochigi (JP); Satoru Sugita, Tochigi (JP); Hiraku Akiho, Miyagi (JP)

(73) Assignees: Sony Chemical & Information Device Corp., Tokyo (JP); Sony Corporation, Tokyo (JP)

( * ) Notice: Subject to any disclaimer, the term of this patent is extended or adjusted under 35 U.S.C. 154(b) by 69 days.

(21) Appl. No.: 11/660,560

(22) PCT Filed: Jun. 15, 2006

(86) PCT No.: PCT/JP2006/012067

§ 371 (c)(1),
(2), (4) Date: Feb. 15, 2007

(87) PCT Pub. No.: WO2007/004401

PCT Pub. Date: Jan. 11, 2007

(65) Prior Publication Data

US 2007/0205291 A1 Sep. 6, 2007

(30) Foreign Application Priority Data

Jun. 30, 2005 (JP) .............................. 2005-192561

(51) Int. Cl.
*G06K 19/06* (2006.01)

(52) U.S. Cl. .................. 235/493; 235/449; 235/380; 235/492; 343/788; 343/748

(58) Field of Classification Search ............... 235/493, 235/492, 451, 380, 449; 343/700, 702, 741–748, 343/788

See application file for complete search history.

(56) References Cited

U.S. PATENT DOCUMENTS

| 5,557,293 A * | 9/1996 | McCoy et al. .............. 343/867 |
| 5,973,650 A * | 10/1999 | Nakanishi .................. 343/742 |
| 7,023,385 B2 * | 4/2006 | Harihara .............. 343/700 MS |
| 2007/0139285 A1 * | 6/2007 | Maruyama et al. .......... 343/741 |
| 2007/0285331 A1 * | 12/2007 | Sarabandi et al. ........... 343/866 |

FOREIGN PATENT DOCUMENTS

| JP | 2004-048135 | 2/2004 |
| JP | 2004-118440 | 4/2004 |
| JP | 2004-166176 | 6/2004 |
| JP | 2004165531 A * | 6/2004 |
| JP | 2004-235884 | 8/2004 |
| JP | 2002-334314 | 11/2004 |
| JP | 2004-348497 | 12/2004 |

* cited by examiner

*Primary Examiner*—Edwyn Labaze
(74) *Attorney, Agent, or Firm*—Haverstock & Owens LLP (57) ABSTRACT

This invention provides an antenna apparatus (60) for use in a non-contact type IC card into and from which data can be written and read by electronic apparatuses having a communication function, by virtue of inductive coupling. The antenna apparatus comprises a loop coil (61) and a magnetic member (62). The loop coil is produced by winding a conductive wire in a plane and configured to perform the inductive coupling. The magnetic member covers one region (61a) of the loop coil, provided at one side, from one surface of the loop coil, passes through the loop coil, and covers the other region (61b) of the loop coil, provided at the other side, from the other surface of the loop coil. The entire region of the loop coil is thus covered.

11 Claims, 7 Drawing Sheets

FIG. 14 ions No.
ANTENNA APPARATUS

TECHNICAL FIELD

The present invention relates to an antenna apparatus for use in non-contact type IC cards into and from which data can be written and read when the cards are induction coupled with an electromagnetic field by electronic apparatuses having a communication function.

This application is based upon and claims the benefit of priority from the prior Japanese Patent Applications No. 2005-192561, filed in Japan on Jun. 30, 2005, the entire content of which is incorporated herein by reference.

BACKGROUND ART

Figure 1:
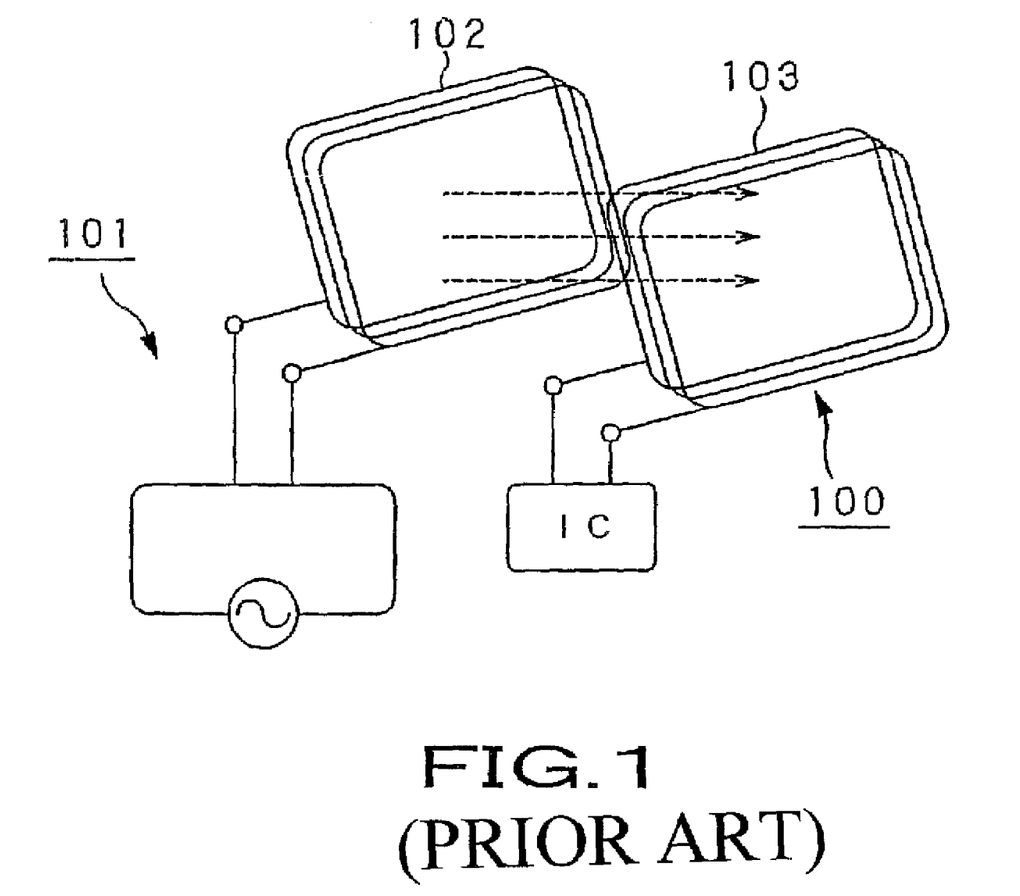
FIG. 1 is a perspective view showing a conventional RFID system.

In recent years, so-called radio frequency Identification (RFID) systems that use non-contact type IC cards or IC tags have been introduced into automatic gates at railway stations, entrance/exit security systems, electronic money systems, and the like. As FIG. 1 schematically shows, the RFID system comprises a non-contact type IC card 100 and a reader/writer 101. The reader/writer 101 can write data into, and read data from, the IC card 100. In the RF system, when a loop antenna 102 provided on the reader-writer 101 radiates a magnetic flux, the magnetic flux is magnetically coupled with a loop antenna 103 provided on the IC card 100, in accordance with the principle of electromagnetic induction. Thus, communication is performed between the IC card 100 and the reader/writer 101.

In the RFID system, the user need not insert the IC card into the reader/writer or set the IC card into contact with the metal contact point provided on the reader/writer as is required in the conventional contact-type IC card system, and data can be easily and fast written and read into and from the IC card. Since the reader/writer 101 supplies power to the IC card 100 by virtue of electromagnetic induction, the IC card 100 need not incorporate a power supply such as a battery. The RFID system therefore can provide IC cards that are simple in configuration and, inexpensive and reliable.

However, the IC card may fail to communicate with the reader/writer if it incorporates an IC tag having communication frequency of 13.56 MHz. That is, the IC tag is influenced by any metal member that lies near the IC card. In the communication achieved at 13.56 MHz by virtue of electromagnetic induction, the IC tag is influenced by any metal member that exists near it, inevitably changing inductance. The change in inductance results in a shift of the resonance frequency or a change in the magnetic flux. As a result, no power can be attained.

In the RFID system described above, to ensure he communicable range between the IC card 100 and the reader/writer 101, the IC card 100 needs to have the loop antenna 103 that can emit an electromagnetic field having a sufficient magnetic field intensity.

A technique that can reduce the influence a metal housing imposes on the loop antenna is known, other than the technique of arranging the loop antenna in an open space. Jpn. Pat. Appln. Laid-Open Publication No. 2001-331772, for example, discloses an antenna apparatus for use in IC cards. This antenna apparatus has a plate of magnetic material, which reduces the influence of any metal member.

DISCLOSURE OF INVENTION

Object the Invention is to Achieve

With an antenna apparatus of the type described in the above patent publication, the communication distance can be increased, but to some extent only. Since the communication range is narrow, communication errors may occur with the non-contact type IC card in some cases. Consequently, the non-contact type IC card cannot fully achieve its convenience.

Accordingly, a technical object of the present invention is to provide an antenna apparatus for use in non-contact type IC card, which can not only be small and thin, but also increase the communication distance between the IC card and an electronic apparatus with a communication function.

An antenna apparatus, which is an embodiment of this invention, is designed for use in a non-contact type IC card into and from which data can be written and read by electronic apparatuses having a communication function, by virtue of inductive coupling. The antenna apparatus comprises: a loop coil produced by winding a conductive wire in a plane and configured to perform the inductive coupling; and a magnetic member covering one region of the loop coil, provided at one side thereof, from one surface of the loop coil, passing through the loop coil, and covering another region of the loop coil, provided at the other side thereof, from the other surface of the loop coil. The magnetic member covers the loop coil at the one surface and from the other surface, and the entire region of loop coil is therefore covered.

The antenna apparatus can be small and thin, can yet increase the communication distance with respect to the electronic apparatus having a communication function and can therefore expand the communication range.

Other objects of the invention and the advantages the invention achieves will become apparent from the embodiments that will be described below with reference to the accompanying drawings.

BEST MODE FOR CARRYING OUT THE INVENTION

Antenna apparatuses according to the embodiment of the present invention will be described with reference to the drawings appended hereto.

Figure 2:
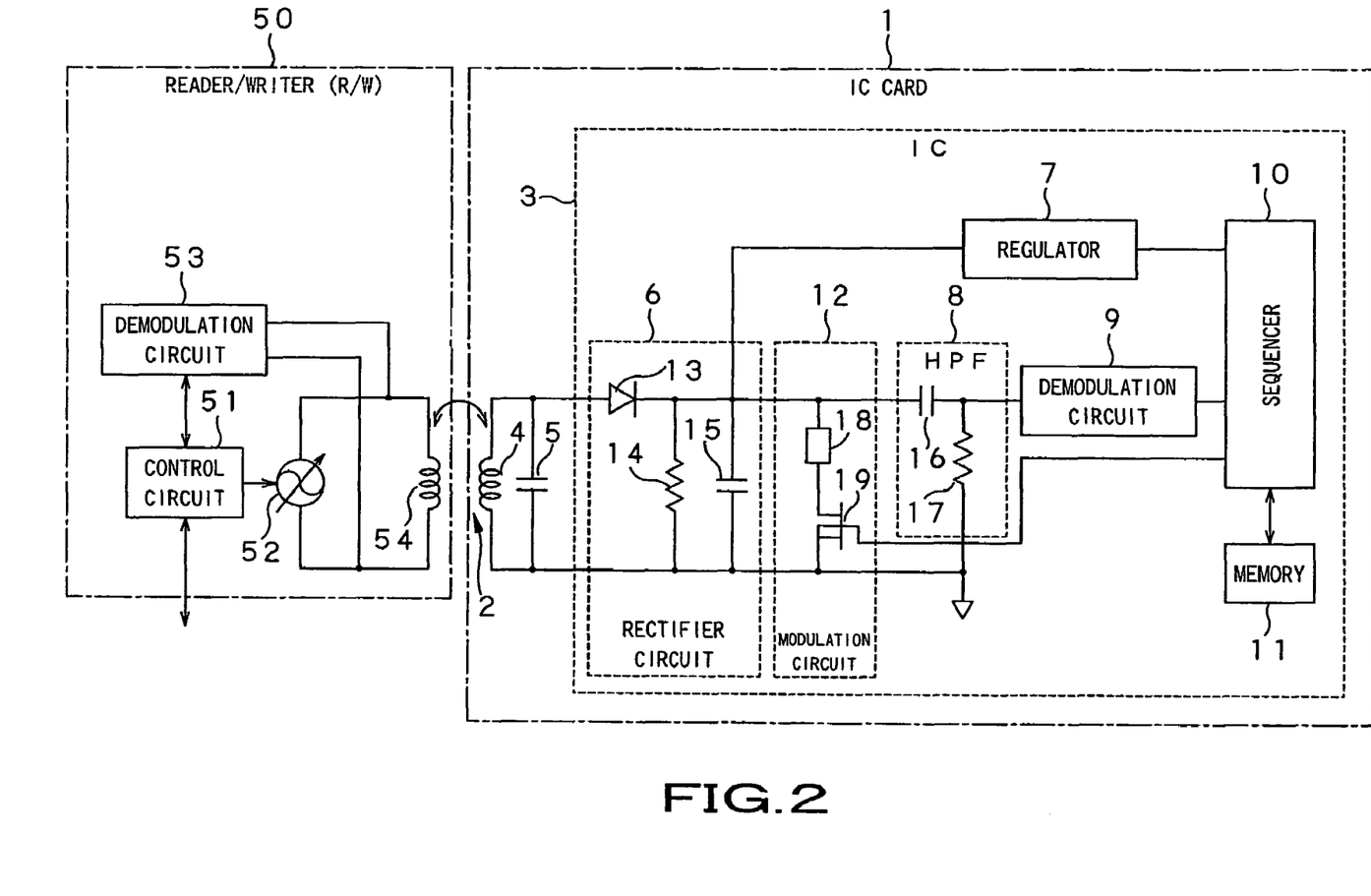
FIG. 2 is a circuit diagram showing an RFID system that uses an antenna apparatus according to the present invention.

First, an RFID system using an antenna apparatus according to this embodiment will be explained. As shown in FIG. 2, the RFID system comprises a non-contact type IC card 1 and a reader/writer 50 (hereinafter referred to as R/W). The R/W 50 can write data into, and read data from, the IC card 1.

The IC card 1 is a battery-less IC card that does not incorporate a power supply such as a battery, in compliant with, for example, ISO7810 Standard. The IC card 1 is of the same size as a so-called credit card. That is, it is rectangular and has such short sides and long sides that it can be placed, in its entirety, on the palm of the hand. The IC card 1 incorporates a substrate and has a loop antenna 2 and an integrated circuit (IC) 3. The loop antenna 2 and the IC 3 are mounted on the substrate. The loop antenna 2 receives and transmits data when it is coupled with an electromagnetic field. The IC 3 includes electronic circuits and a memory. The electronic circuits perform various processes.

The loop antenna 2 is constituted by a loop coil 4 formed by winding a conductive wire in a plane. The loop coil 4 is connected in parallel to a capacitor 5. The coil 4 and the capacitor 5 constitute a resonance circuit. The loop antenna 2 is coupled with the electromagnetic field radiated from the loop antenna provided on the R/W 50, which will be described later. The loop antenna 2 converts the electromagnetic field into an electric signal, which is supplied to the IC.

The IC 3 comprises a rectifier circuit 6, a regulator 7, a high-pass filter (HPF) 8, a demodulation circuit 9, a sequencer 10, a memory 11, and a modulation circuit 12. The rectifier circuit 6 receives the electric signal supplied from the loop coil 4 and rectifies the signal, smoothing the same. The regulator 7 receives the electric signal supplied from the rectifier circuit 6 and converts the signal to AC power. The HPF 8 extracts a high-frequency component from the electric signal supplied from the rectifier circuit 6. The demodulation circuit 9 demodulates the high-frequency signal input from the HPF 8. The sequencer 10 controls the data-writing process and data-reading process in accordance with the data supplied from the demodulation circuit 9. The memory 11 stores the data supplied from the demodulation circuit 9. The modulation circuit 12 modulates the data transmitted from the loop coil 4.

The rectifier circuit 6 comprises a diode 13, a resistor 14 and a capacitor 15. The anode terminal of the diode 13 is connected to one end of the loop coil 4 and to one end of the capacitor 5. The cathode terminal of the diode 13 is connected the other end of the resistor 14 and the other end of the capacitor 15. The resistor 14 and the capacitor 15 are connected, at the other end, to the other end of the loop coil 4 and the other end of the capacitor 5. The rectifier circuit 6 outputs an electric signal generated by rectifying and smoothing the electric signal supplied from the loop coil 4. The signal output from the rectifier circuit 6 is supplied to the regulator 7 and the HPF 8.

The regulator 7 is connected to the cathode terminal of the diode 13, to one end of the resistor 14 and to one end of the capacitor 15 of the above-described rectifier circuit 6. The regulator 7 controls the voltage fluctuation (data component) of the electric signal supplied from the rectifier circuit 6, thereby stabilizing this electric signal. The signal thus stabilized is supplied, as DC power, to the sequencer 10. Thus, the voltage fluctuation that occurs as the IC card 1, for example, moves and the voltage fluctuation that occurs as the power consumed in the IC card 1 changes, are suppressed. Note that such voltage fluctuations may cause the sequencer 10 to make errors in its operation.

The HPF 8 comprises a capacitor 16 and a resistor 17. It extracts the high-frequency component from the electric signal supplied from the rectifier circuit 6. The high-frequency component is supplied to the demodulation circuit 9.

The demodulation circuit 9 is connected to the other end of the capacitor 16 and one end of the resistor 17 of the above-described HPF 8. It demodulates the high-frequency signal input from the HPF 8 and outputs the signal to the sequencer 10.

The sequencer 10 incorporates a read only memory (ROM) and a random access memory (RAM) and is connected to the demodulation circuit 9. In the sequencer 10, the signal (command) input from the demodulation circuit 9 is stored into the RAM and is analyzed in accordance with the program stored in the ROM. On the basis of the results of analysis, the data stored in the memory 11 is read as needed, or the data supplied from the demodulation circuit 9 is written into the memory 11. The sequencer 10 generates a response signal, which is supplied to the modulation circuit 12, giving a response to the command.

The memory 11 is constituted by a nonvolatile memory such as an electrically erasable programmable read-only memory (EEPROM) and is connected to the sequencer 10 described above. The memory 11 stores the data supplied from the demodulation circuit 9 on the basis of the results of the analysis performed by the sequencer 10.

The modulation circuit 12 is constituted by a serial circuit of impedance 18 and a field-effect transistor (FET) 19. The impedance 18 is connected, at one end, to the cathode terminal of the diode 13 provided in the rectifier circuit 6, and at the other end, to the drain terminal of the FET 19. The source terminal of the FET 19 is connected to the ground. The gate terminal of the FET 19 is connected to the sequencer 10. The modulation circuit 12 is connected in parallel to the loop coil 4 that constitutes the above-mentioned resonance circuit. The modulation circuit 12 causes the FET 19 to perform switching in accordance with the signal supplied from the sequencer 10. Namely, the modulation circuit 12 performs so-called added modulation, causing fluctuation of the load of the impedance 18, with respect to the loop coil 4.

On the other hand, the R/W 50 comprises a control circuit 51, a modulation circuit 52, a demodulation circuit 53, and a loop antenna 54. The control circuit 51 controls the data to be transmitted and received. The modulation circuit 52 modulates data, and the demodulation circuit 53 demodulates data. The loop antenna 54 transmits and receives data when coupled with an electromagnetic field.

The control circuit 51 generates control signals in accordance with the instructions externally input or the program stored. The control signals control the modulation circuit 52 and the demodulation circuit 53 and generate transmission data that corresponds to the instructions. The transmission data is supplied to the modulation circuit 52. Further, the control circuit 51 reproduces data from the response data supplied from the demodulation circuit 53. The data thus reproduced is output to an external apparatus.

The modulation circuit 52 modulates the transmission data input from the control circuit 51. The data modulated is supplied to the loop antenna 54.

The demodulation circuit 53 demodulates a modulated wave supplied from the loop antenna 54, generating demodulated data. This data is supplied to the control circuit 51.

The loop antenna 54 is constituted by a loop coil formed by winding a conductive wire in a plane. The antenna 54 radiates an electromagnetic field that corresponds to the modulated wave supplied from the modulating circuit 52. The antenna 54 also detects the load fluctuation of the loop coil 4. A capacitor for resonance may be connected in parallel or in series to the loop antenna 54, in accordance with the drive-circuit system of the R/W 50.

In the RFID system so configured as described above, when a data-write instruction is given to the IC card 1 the control circuit 51 of the R/W 50 generates a write command signal in accordance with the instruction. At the same time, the control circuit 51 generates transmission data (data to be written) that accords with the data-write instruction. The transmission data is supplied to the modulation circuit 52. The modulation circuit 52 then modulates the amplitude of the oscillation signal. The signal thus modulated is supplied to the loop antenna 54. The loop antenna 54 radiates an electromagnetic signal corresponding to the modulated signal input to the R/W 50.

The resonance circuit provided in the IC card 1 and constituted by the loop coil 4 and the capacitor 5 has a resonance frequency of, for example, 13.56 MHz. This frequency corresponds to the oscillation frequency (carrier frequency) of the signal transmitted from the R/W 50. Hence, the resonance circuit performs resonance, receiving the electromagnetic field radiated from the loop antenna 54. The resonance circuit converts the electromagnetic field into an electric signal, which is then supplied to the IC 3. In the IC 3, the electric signal is input to the rectifier circuit 6. The rectifier circuit 6 rectifies the signal, smoothing the same. The electric signal thus smoothed is supplied to the regulator 7. The regulator 7 controls the voltage fluctuation (data component) of the electric signal supplied from the rectifier circuit 6, thereby stabilizing this electric signal. The signal thus stabilized is supplied, as DC power, to the sequencer 10.

The signal smoothed by the rectifier circuit 6 is supplied via the modulation circuit 12 to the HPF 8. The HPF 8 extracts the high-frequency component from the electric signal supplied from the rectifier circuit 6. The high-frequency component is supplied to the demodulation circuit 9. The demodulation circuit 9 demodulates the high-frequency signal input to it. The signal demodulated is supplied to the sequencer 10. The sequencer 10 makes the RAM store the signal (command) input from the demodulation circuit 9. Using the program stored in the ROM, the sequencer 10 analyzes the signal. On the basis of the results of the analysis performed by the sequencer 10, the memory 11 stores the data supplied from the demodulation circuit 9.

If the signal (command) input from the demodulation circuit 9 is a read instruction, the sequencer 10 reads from the memory 11 the data that corresponds to this instruction. In accordance with the data read from the memory 11, the sequencer 10 performs switching on the FET 19 of the modulation circuit 12. When the FET 19 is turned on in the modulation circuit 12, the loop coil 4 is connected to the impedance 18. When the FET 19 is turned off, the loop coil 4 is no longer connected in series to the impedance 18. Thus, the impedance of the loop antenna 54 of the R/W 50, which remains magnetically coupled with the loop antenna 2 of the IC card 1, changes in accordance with the read data. As a result, the terminal voltage of the loop antenna 54 varies with this impedance. The demodulation circuit 53 demodulates this variation of the terminal voltage, whereby the R/W 50 can receive the read data.

Thus, communication is accomplished between the IC card 1 and the R/W 50. Namely, the R/W 50 can write data into, and read data from, the IC card 1, though it does not contact the IC card 1 at all.

Figure 3:
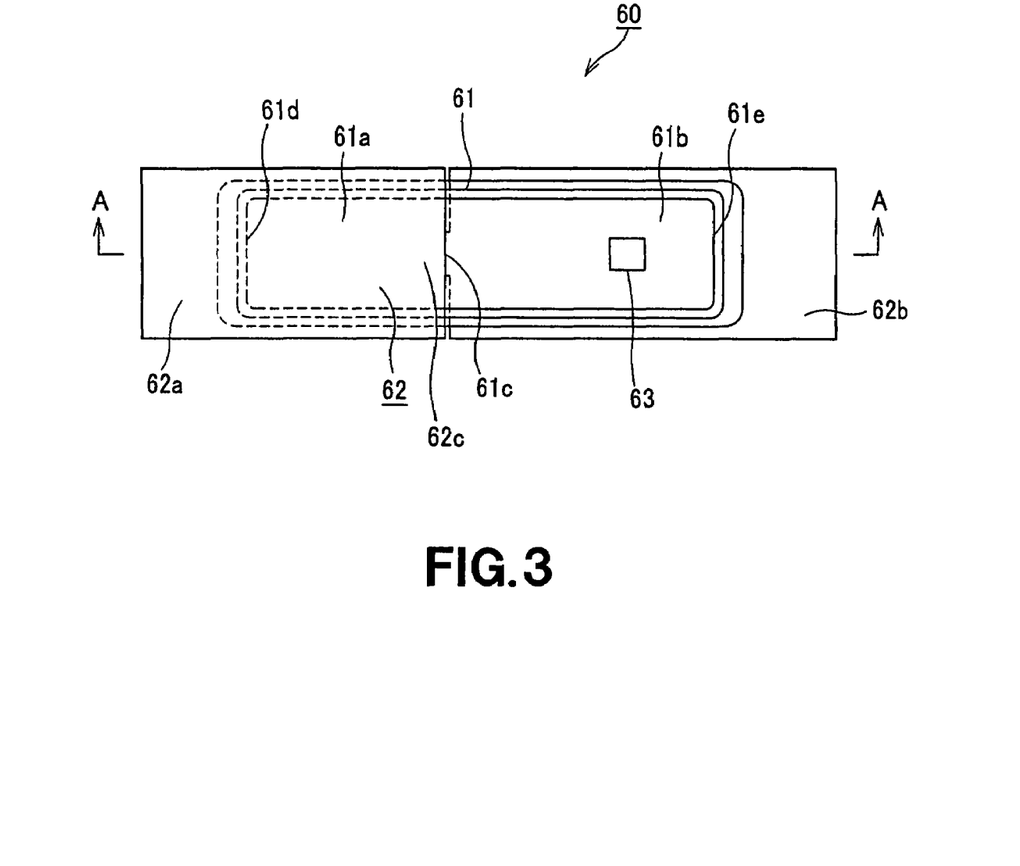
FIG. 3 is a plan view showing the antenna apparatus according to this invention.
Figure 4:
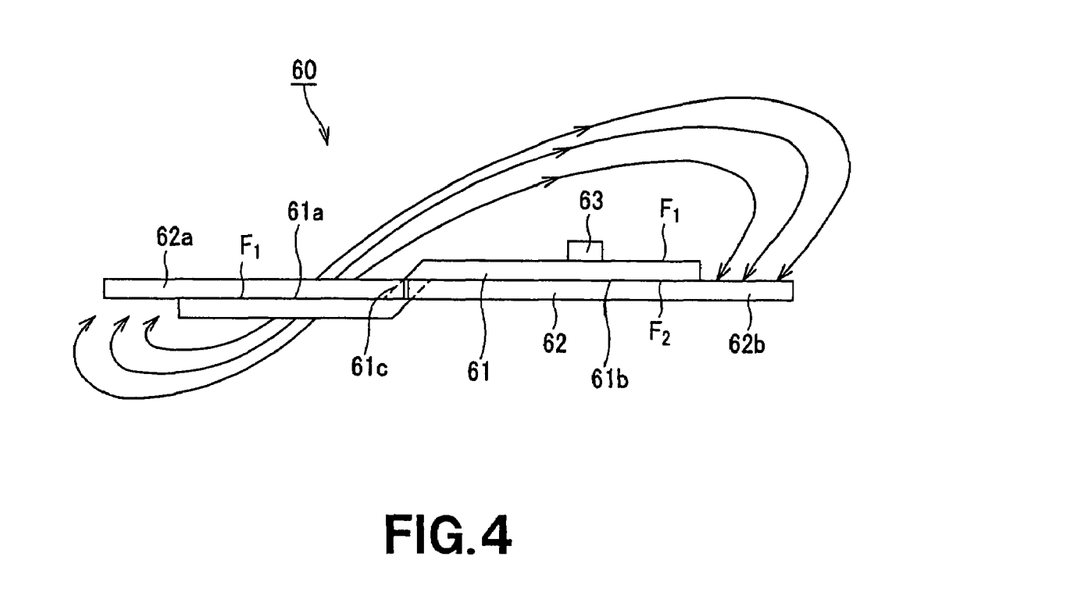
FIG. 4 is a side view depicting the distribution of a magnetic field at the antenna apparatus according to this invention.
Figure 5:
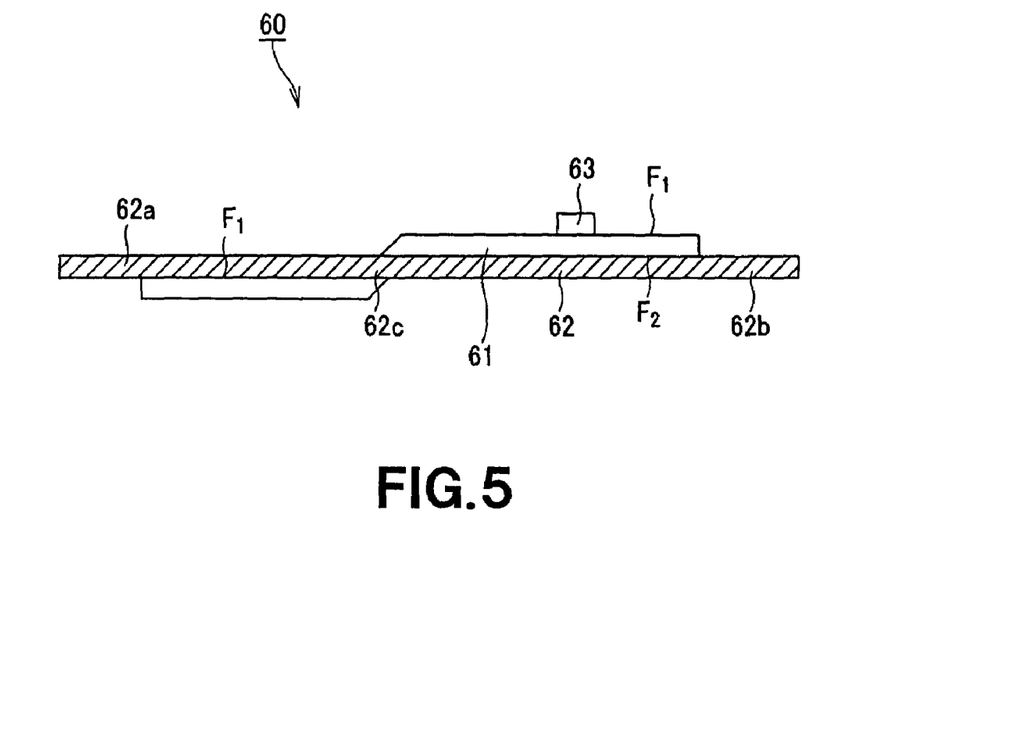
FIG. 5 is a sectional view taken along line A-A shown in FIG. 3.

The loop antenna 2 provided on the IC card 1 is an antenna apparatus 60 so constituted as shown in FIGS. 3, 4 and 5. The antenna apparatus 60 comprises a loop coil 61 and a magnetic member 62. The loop coil 61 is produced by winding a conductive wire in a plane and configured to perform the inductive coupling. The magnetic member 62 covers one region 61a of the loop coil 61, from one surface F1 of the loop coil 61. The magnetic member 62 passes through the loop coil 61 and covers the other region 61b of the loop coil 61, from the other surface F2 of the loop coil 61. That is, the loop coil 61 is covered by the magnetic member 62 from one surface F1 and also from the other surface F2, thus the entire region of the loop coil 61 is covered, at both surfaces.

The loop coil 61 has been formed by etching foils of conductive metal, such as electrolyte copper, provided on both surfaces of a flexible insulating film or substrate made of, for example, polyimide, PET or the like. The method of forming the loop coil 61 is not limited to this. The loop coil 61 may be formed by printing conductor patterns made of conductive paste such as silver paste, or by sputtering a metal target and thereby forming conductor patterns on the substrate. The regions 61a and 61b of the loop coil 61 cover regions 61d and 61e that are opposed to the conductive wire that forms a rectangular coil. The loop coil 61 has an insertion hole 61c, through which magnetic member 62 is inserted and held. The insertion hole 61c is circular or elliptical, having three or more apexes. The turns of the loop coil, which lie at one side, may be arranged at intervals different from those at the opposite side. In this case, the loop coil is an asymmetrical one, further increasing the communicable range.

The magnetic member 62 has a first part 62a, a second part 62b and an insertion part 62c. The first part 62a covers the first region 61a of the loop coil 61, from one surface F1 thereof. The second part 62b covers the other region 61b of the loop coil 61, from the other surface F2 thereof. The insertion part 62c passes through the insertion hole 61c and connects the first and second parts 62a and 62b. That part of the surface F1, which is not covered with the magnetic member 62, serves as a communication region. Namely, the surface F1 is opposed to the R/W 50 to achieve communication with the R/W 50.

The region 61b of the loop coil 61, which is covered with the second part 62b of the magnetic member 62, has a larger area than the region 61a of the loop coil 61, which is covered with the first part 62a of the magnetic member 62. The exposed part of the other region 61b of the loop coil 61, i.e., the part not covered with the second part 62b of the magnetic member 62, that is the one surface F1 is used as communication region.

The magnetic member 62 is broader and longer than the loop coil 61. The first part 62a and the second part 62b cover the surfaces F1 and F2, respectively, whereby the loop coil 61 is covered in its entirety, at both surfaces.

The insertion part 62c of the magnetic member 62 is narrower and shorter than the first and second parts 62a and 62b thereof. That is, the magnetic member 62 has notches in both lateral edges of the insertion part 62c. These notches define the first part 62a, the second part 62b and the insertion part 62c. The length of the notches may appropriately be selected in accordance with the thickness of the magnetic member 62 and the size of the insertion hole 61c of the loop coil 61. The first and second parts 62a and 62b are formed but not limited by cutting notches. The first and second parts 62a and 62b may be prepared independently and may then be jointed at the opening part. If this is the case, the loop coil may have regions covered, at both surfaces, with the first and second parts of the magnetic member 62.

To manufacture the magnetic member 62, a magnetic paint is prepared, by mixing a binder made of rubber-based resin, with magnetic powder, a solvent and an additive. The magnetic powder is made of Fe-based material that contains 96 wt % of Fe, 3 wt % of Cr, 0.3 wt % of Co and some other magnetic materials. The magnetic paint is filtered, removing, from the binder, any magnetic particles having diameters larger than a predetermined value. In an extrusion molding machine, the magnetic paint is extruded from a tank through a nip between a pair of rollers, thereby forming a long magnetic strip. The magnetic strip is dried, removing the solvent therefrom. Then, in a coating machine, one major surface of the magnetic strip is coated with adhesive while the strip passes through the nip between a pair of rollers. Further, the magnetic strip is punch-pressed, forming a magnetic member 62.

The magnetic member 62 can be made of any soft magnetic material and produced by any method, so long as it exhibits satisfactory magnetic characteristics. The magnetic material may be, for example, amorphous alloy, Co—Cr alloy, Fe—Al alloy, Sendust alloy (Fe—Al—Si), Fe—Ni alloy, Fe—Co—Ni alloy or the like. Powder of such an alloy is kneaded with a rubber-based binder and dispersed in the binder, providing a paste. The paste is applied, forming the magnetic member. Alternatively, the magnetic member may be a thin soft magnetic plate formed by electroplating or sputtering. Still alternatively, the magnetic member may be a thin bulk plate made of only one material such as ferrite-based powder (Ni—Zn ferrite or Mn—Zn ferrite), press-sintered and containing no binder. Moreover, an insulating layer may be formed on the plate made of the above-mentioned powder. To provide the insulating layer, an oxide film may be formed by heating and then be annealed, or an oxide film may be formed by sputtering on the plate made of the powder. The magnetic member may be a sheet that has flexibility. Otherwise, it may be a hard plate made of sintered material, such as a ferrite plate.

The magnetic material 62 has, in its in-plane direction, an effective magnetic permeability $\mu'$ (real-number part) of 30 or more and an effective magnetic permeability $\mu''$ (imaginary-number part) of 1.0 or less, each at the communication frequency. Since the magnetic material 62 has effective magnetic permeability $\mu'$ of 30 or more and effective magnetic permeability $\mu''$ of 1.0 or less in the antenna apparatus 60, the range of communication between the IC card 1 and the R/W 50 can be expanded even if the thickness of the magnetic material is reduced. If the effective magnetic permeability $\mu'$ is 50 or more, the communication distance can be increased.

To manufacture the antenna apparatus 60, an IC chip 63 is connected to the loop coil 61 that has been produced as described above. As a result, the IC chip 63 and the coil 61 constitute a resonance circuit. The IC chip 63 used is, for example, an IC chip that accords with ISO14443 Standard or ISO15693 Standard. The IC chip 63 is connected to the loop coil by ACF method or wire bonding. Nonetheless, the method of connecting the IC chip is not limited in particular. Next, an insertion hole 61c is made at the center part of the loop coil 61, so that the magnetic member 62 may pass through the loop coil 61. The insertion part 62c of the magnetic member 62 is inserted in the insertion hole 61c. The first part 62a covers the first region 61a of the loop coil 61 at one surface F1, and the second part 62b covers the other region 61b of the loop coil 61 at the other surface F2. In this condition, the loop coil 61 and the magnetic member 62 are bonded to each other. At this time, the magnetic member 62 is so positioned that the adhesive-coated surface faces the major surface that is opposed to the loop coil 61. The antenna apparatus 60 can thus be manufactured. Since the loop coil 61 and the magnetic member 62 are bonded to each other with adhesive, with the member 62 inserted in the insertion hole 61c, the antenna apparatus 60 can be easily manufactured in view of its structure. In addition, antenna apparatus 60 can be thin and small because the thickness of both the magnetic member 62 and the loop coil 61 can be reduced.

A magnetic field is distributed at the antenna apparatus 60 thus configured, as is illustrated in FIG. 4. That is, the magnetic field is intense at one surface F1 of the loop coil 61, which is opposite to the other region 61b that is covered with the second part 62b of the magnetic member 62, which has a larger area than the first part 61a. That is, the distribution of the magnetic field at the antenna apparatus 60 is asymmetrical, unlike the symmetrical distribution of the magnetic field that the conventional antenna apparatus generates. Moreover, the intensity of the magnetic field can be adjusted by changing the areas of the regions that the first and second parts 62a and 62b cover, respectively.

Hence, the antenna apparatus 60 can increase the communication distance between the IC card 1 and the R/W 50 by controlling the distribution of the magnetic field radiated from the loop coil 61 and can widen the communicable range. The antenna apparatus 60 can enable the IC card 1 and the R/W 50 to communicate with each other. That is, the R/W 50 can write data into, and read data from, the IC card 1, without contacting the IC card 1.

In the antenna apparatus 60 according to the embodiment of this invention, the magnetic member 62 is arranged as shown in FIG. 4, covering the first region 61a of the loop coil 61 at one surface F1, and passes through the loop coil 61, covering the other region 61b and at the other surface of the loop coil 61. Thus, the magnetic member 62 covers all regions of the loop coil 61, at one surface and the other surface, whereby the magnetic field distribution at one surface F1 of the loop coil 61 can be emphasized. The antenna apparatus 60 can therefore be made thin and small. Further, since the intensity of the magnetic field is increased, the range of the communication between the IC card 1 and the R/W 50 can be expanded.

In the antenna apparatus 60 according to the embodiment of the present invention, the magnetic field distribution at one surface F1 of the loop coil 61 is emphasized and the magnetic member used has a predetermined effective magnetic permeability $\mu'$ and a predetermined effective magnetic permeability $\mu''$. Therefore, the antenna apparatus can be thin and can expand the communication range, greatly increasing the communication distance in a free space. In addition, the influence of any metal member can be reduced, greatly increasing the communication range in the metal member.

As described above, the antenna apparatus 60 according to this invention improves the readiness of the communication between the IC card 1 and the R/W 50 and enables the R/W 50 to write data into, and read data from, the IC card 1, reliably without contacting the IC card 1.

Figure 6:
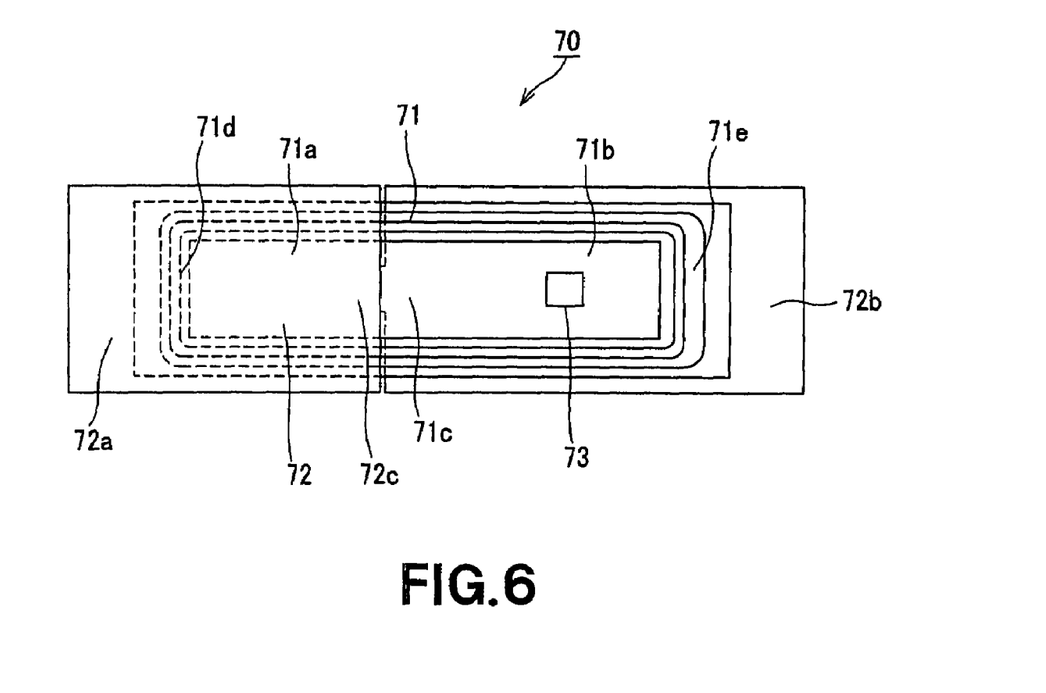
FIG. 6 is a plan view of an antenna apparatus according to another embodiment of the present invention.

The loop antenna 2 provided on the IC card 1 may be such an antenna apparatus 70 as shown in FIG. 6. This antenna apparatus 70 is asymmetrical, because the opposing sides of the loop coil differ in terms of the width of windings and/or the intervals thereof.

As FIG. 6 shows, the antenna apparatus 70 comprises a loop coil 71 and a magnetic member 72. The loop coil 71 is produced by winding a conductive wire in a plane and configured to perform the inductive coupling. The magnetic member 72 covers one region 71a of the loop coil 71, from one surface of the loop coil 71. It passes through the loop coil 71 and covers the other region 71b of the loop coil 71, from the other surface of the loop coil 71. That is, the loop coil 71 is covered with the magnetic member 72 at all regions from both surfaces. The loop coil 71 has been manufactured in the same way as the loop coil 61 described above. The loop coil 71 is formed asymmetrical in terms of the widths of windings at the opposing sides. Namely, the part 71e covered with the region 71b of the loop coil 71 has a greater winding width than the part 71d covered with the region 71a. Further, the loop coil 71 has an insertion hole 71c, through which magnetic member 72 is inserted and held. The insertion hole 71c is circular or elliptical, having three or more apexes.

The magnetic member 72 has a first part 72a, a second part 72b and an insertion part 72c. The first part 72a covers the one region 71a of the loop coil 71, from one surface thereof. The second part 72b covers the other region 71b of the loop coil 71, from the other surface thereof. The insertion part 72c passes through the insertion hole 71c formed in the loop coil and connects the first and second parts 72a and 72b. That part of one surface, which is not covered with the magnetic member 72, serves as communication region. Thus, this surface of the loop coil 71 is opposed to the R/W 50.

The region 71b of the loop coil 71, which is covered with the second part 72b of the magnetic member 72, has a larger area than the region 71a of the loop coil 71, which is covered with the first part 72a of the magnetic member 72. The part 71e at which the loop coil 71 has a large winding width is arranged in the other region 71b that is covered with the second part 72b having a large area. The exposed part of the other region 71b of the loop coil 71, i.e., the part not covered with the second part 72b of the magnetic member 72, which has a large area, is used as communication region.

The magnetic member 72 is broader and longer than the loop coil 71. The first part 72a and the second part 72b cover one surface and the other surface, respectively, whereby the loop coil 72 is covered in its entirety, at both surfaces.

The insertion part 72c of the magnetic member 72 is narrower than the first and second parts 72a and 72b thereof. That is, the magnetic member 72 has notches in both lateral edges of the insertion part 72c. These notches define the first part 72a, the second part 72b and the insertion part 72c. The length of the notches may appropriately be determined by the thickness of the magnetic member 72 and the size of the insertion hole 71c of the loop coil 71. The first and second parts 72a and 72b are formed but not limited by cutting notches. The first and second parts 72a and 72b may be prepared independently and may then be jointed at the opening part. If this is the case, the loop coil may have regions that are covered, at both surfaces, with the first and second parts of the magnetic member. This magnetic member 72 is manufactured in the same way as the above-described magnetic member 62. Therefore, how it is made will not be explained in detail.

To manufacture the antenna apparatus 70 according to the present invention, an IC chip 73 is connected to the loop coil 71 produced as described above. As a result, the IC chip 73 and the coil 71 constitute a resonance circuit. The IC chip 73 is the same as the IC chip 63 described above, and the method of connecting the chip 73 is the same as the method of connecting the chip 63. Further, the method of bonding the magnetic member 72 to the loop coil 71 is the same as in manufacturing the antenna apparatus 60 described above.

The magnetic field distribution at the antenna apparatus 70 thus configured is emphasized at one surface that is opposed to that surface of the other region 71b covered with the second part 72b having a large area from the regions of the loop coil 71 which is covered with the first and second parts 72a and 72b of the magnetic member 72. This is because the second parts 72b having a large area is covered and also because the winding width of the other part 71e of the loop coil 71, which is arranged in the other region 71b covered with the second part 72b, is broader than the part 71d. Here, the winding width of the part 71e of the loop coil 71 arranged in the other region 71b covered with the second part 72b is broader than the part 71d. Nevertheless, the same advantage can be attained even if the turns of the winding at the part 71e are arranged at longer intervals than at the part 71d.

That is, the distribution of the magnetic field at the antenna apparatus 70 is asymmetrical, unlike the symmetrical distribution of the magnetic field that the conventional antenna apparatus generates. Moreover, the intensity of the magnetic field can be adjusted by changing the areas of the regions that the first and second parts 62a and 62b cover, respectively, and by changing the intervals and/or width of the turns of the winding at the other part 71e of the loop coil 71, which are arranged in the other region 71b that is covered with the second part 72b.

Therefore, this antenna apparatus 70 can increase the communication distance between the IC card 1 and the R/W 50 by controlling the distribution of the magnetic field radiated from the loop coil 71 and can widen the communicable range. The antenna apparatus 70 can enable the IC card 1 and the R/W 50 to communicate with each other. That is, the R/W 50 can write data into, and read data from, the IC card 1, without contacting the IC card 1.

In the antenna apparatus 70 according to the present invention, the magnetic member 72 is arranged, covering one region 71a of the loop coil 71 at one surface, and passes through the loop coil 71, covering the other region 71b at the other surface. Thus, the magnetic member 72 covers all regions of the loop coil 71, at one surface and the other surface. In addition, the winding width of the part 71e of the loop coil 71 arranged in the other region covered at the other surface is broader than the part 71d. Hence, only the magnetic field distribution at one surface of the loop coil 71 can be emphasized. The antenna apparatus 70 can therefore be made thin and small. Moreover, the antenna apparatus 70 can expand the range of the communication between the IC card 1 and the R/W 50, because the intensity of the magnetic field is increased.

In the antenna apparatus 70 according to the present invention, the magnetic field distribution at one surface F1 of the loop coil 71 is emphasized and the magnetic member used has a predetermined effective magnetic permeability μ' and a predetermined effective magnetic permeability μ". Therefore, the antenna apparatus can be thin and can expand the communication range, greatly increasing the communication distance in a free space. Furthermore, the influence of any metal member can be reduced, greatly increasing the communication range in the metal member.

As described above, the antenna apparatus 70 according to this invention improves the readiness of the communication between the IC card 1 and the R/W 50 and enables the R/W 50 to write data into, and read data from, the IC card 1, reliably without contacting the IC card 1.

Embodiments of the antenna apparatus 60 according to the present invention will be described below. More precisely, four comparative examples of the antenna apparatus 60 according to this invention will be described with reference to FIG. 7 to FIG. 14.

Figure 7:
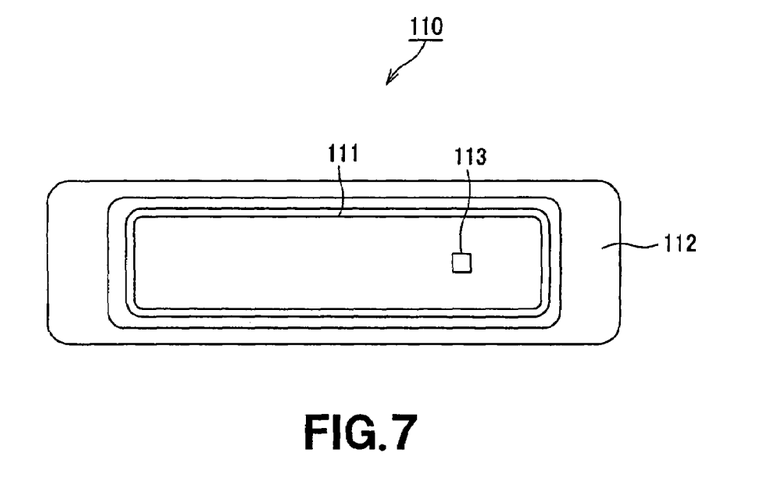
FIG. 7 is a plan view of an antenna apparatus, which is comparative example 1 for comparison with the antenna apparatus according to this invention.
Figure 8:
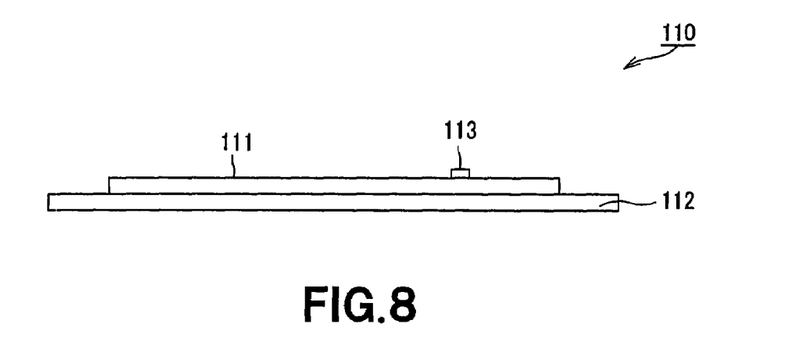
FIG. 8 is a side view of the antenna apparatus, or comparative example 1.

Antenna apparatus 110, i.e., comparative example 1, comprises a loop coil 111 and a magnetic member 112 as shown in FIG. 7 and FIG. 8. The loop coil 111 is produced by winding a conductive wire in a plane and configured to perform the inductive coupling. The magnetic member 112 is bonded to the surface of the loop coil 111, which faces away from the surface that may face an IC card 1. The magnetic member 112 is broader and longer than the loop coil 111.

Figure 9:
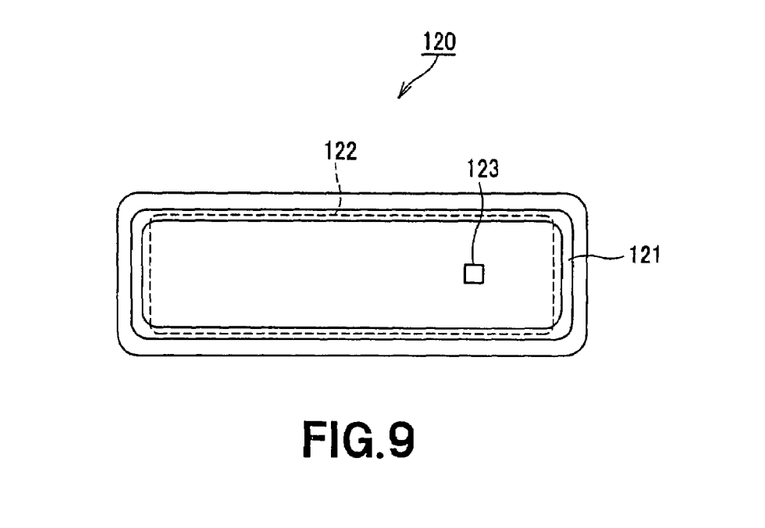
FIG. 9 is a plan view of an antenna apparatus, which is comparative example 2 for comparison with the antenna apparatus according to this invention.
Figure 10:
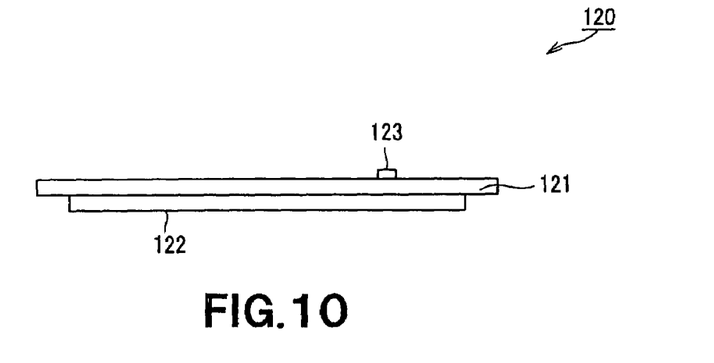
FIG. 10 is a side view of the antenna apparatus, or comparative example 2.

Antenna apparatus 120, i.e., comparative example 2, comprises a loop coil 121 and a magnetic member 122 as shown in FIG. 9 and FIG. 10. The loop coil 121 is produced by antenna apparatuses 110, 120, 130 and 140, i.e., comparative examples 1 to 4, each have such effective magnetic permeabilities $\mu'$ and $\mu''$ as shown in the following Table 1. These antenna apparatuses were evaluated for the communicable distances they achieve. Table 1 shows the communicable distance in a metal member and the communicable distance in a free space, which each apparatus achieved. Note that embodiment 1 and comparative example 1 have a magnetic member made of ferrite-based magnetic material and that embodiment 2 and comparative example 2 have a magnetic member made of Fe—Si—Cr-based magnetic material. The effective magnetic permeability $\mu'$ is the AC specific permeability measured at the carrier frequency (13.56 MHz) by an impedance analyzer or the like, for ring-shaped samples, each comprising a ring having a diameter ($\phi$) of, for example, 7 mm and a 5-turn wire coil wound around the ring.

TABLE 1

| Structure | Example 1 Antenna apparatus 60 | Example 2 Antenna apparatus 60 | Comparative Example 1 Antenna apparatus 110 | Comparative Example 2 Antenna apparatus 120 | Comparative Example 3 Antenna apparatus 130 | Comparative Example 4 Antenna apparatus 140 |
|---|---|---|---|---|---|---|
| Frequency [MHz] at the measuring point | 13.56 | 13.56 | 13.56 | 13.56 | 13.56 | 13.56 |
| Effective magnetic permeability $\mu'$ (real-number part) | 30 | 40 | 30 | 30 | 30 | 30 |
| Effective magnetic permeability $\mu''$ (imaginary-number part) | 0.4 | 0.1 | 0.4 | 0.4 | 0.4 | 0.4 |
| Result (communicable distance in a metal member) | 30 mm | 35 mm | 20 mm | 15 mm | 22 mm | 20 mm |
| Result (communicable distance in a free space) | 40 mm | 40 mm | 40 mm | 40 mm | 40 mm | 40 mm | winding a conductive wire in a plane and configured to perform the inductive coupling. The magnetic member 122 is bonded to the surface of the loop coil 121, which faces away from the surface that may face an IC card 1. The magnetic member 122 is narrower and shorter than the loop coil 121.

Figure 11:
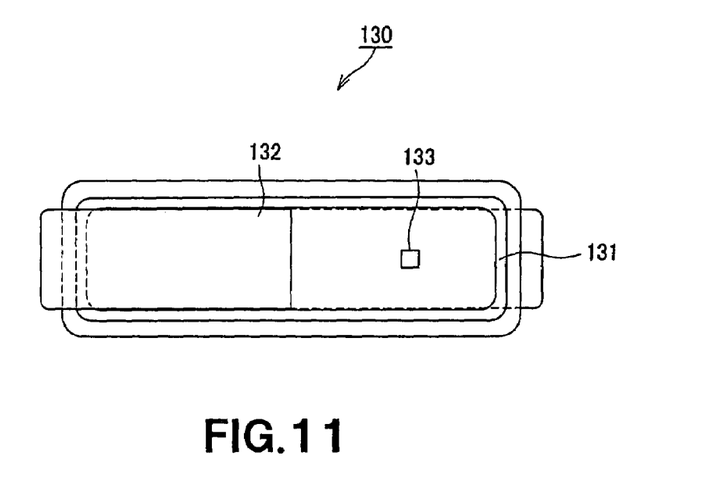
FIG. 11 is a plan view of an antenna apparatus, which is comparative example 3 for comparison with the antenna apparatus according to this invention.
Figure 12:
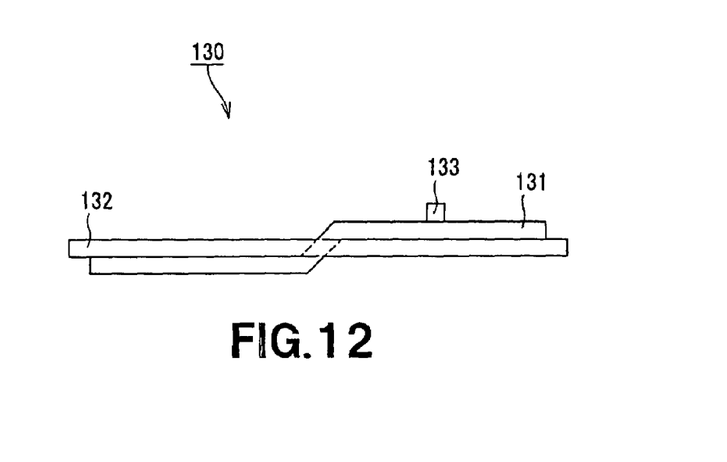
FIG. 12 is a side view of the antenna apparatus, or comparative example 3.

Antenna apparatus 130, i.e., comparative example 3, comprises a loop coil 131 and a magnetic member 132 as shown in FIG. 11 and FIG. 12. The loop coil 131 is produced by winding a conductive wire in a plane and configured to perform the inductive coupling. The magnetic member 132 is bonded to the loop coil 131, such that it passes through the insertion hole of the loop coil 131 and is bonded, covering a part of the coil 131 at one surface and covering another part of the coil 131 at the other surface. The magnetic member 132 is narrower and longer than the loop coil 131.

Figure 13:
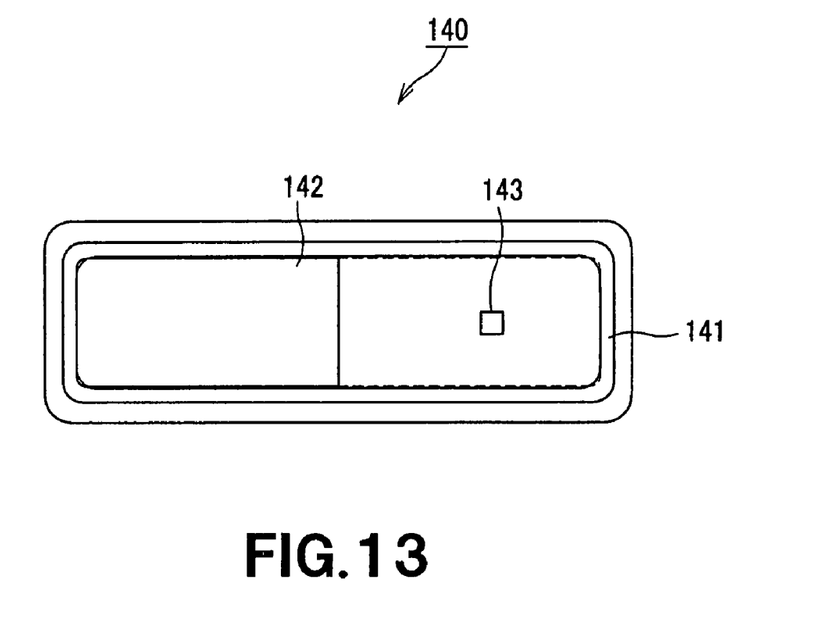
FIG. 13 is a plan view of an antenna apparatus, which is comparative example 4 for comparison with the antenna apparatus according to this invention.
Figure 14:
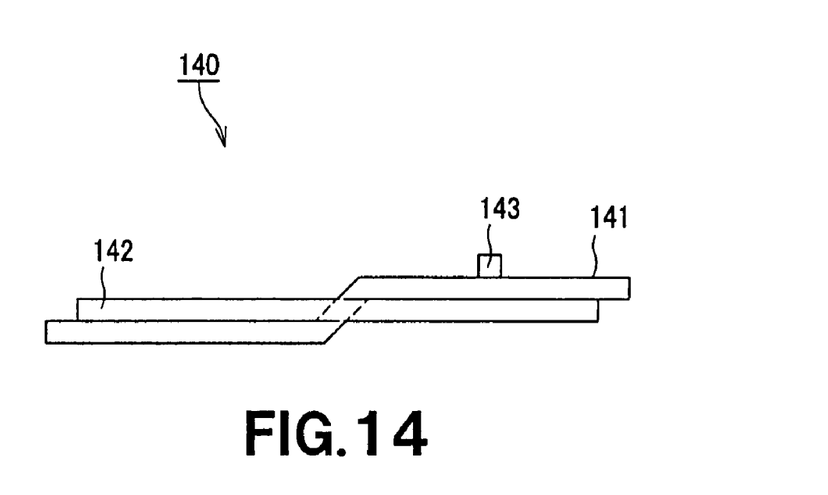
FIG. 14 is a side view of the antenna apparatus, or comparative example 4.

Antenna apparatus 140, i.e., comparative example 4, comprises a loop coil 141 and a magnetic member 142 as shown in FIG. 13 and FIG. 14. The loop coil 141 is produced by winding a conductive wire in a plane. The magnetic member 142 is bonded to the loop coil 141, such that it passes through the insertion hole of the loop coil 141 and is bonded, covering a part of the coil 141 at one surface and covering another part of the coil 141 at the other surface. The magnetic member 142 is narrower and shorter than the loop coil 141.

Assume that embodiments 1 and 2 of the same structure as the antenna apparatus 60 according to this invention and the As seen from Table 1, embodiments 1 and 2, i.e., antenna apparatuses 60 according to the invention, can increase not only the communicable distance in a free space, but also the communicable distance in a metal member. That is, they can expand the communicable range.

Further, in the antenna apparatuses, i.e., embodiments 1 and 2, the effective magnetic permeability $\mu'$ and the effective magnetic permeability $\mu''$, both measured at the communication frequency in the in-plane direction of the magnetic member, can be 30 or more and 1.0 or less, respectively. Moreover, they can expand the range of communication between the IC card 1 and the R/W 50.

Embodiments of the present invention have been described, with reference to the drawings. Nonetheless, the invention is not limited to the embodiments. As is obvious to those skilled in the art, various changes, replacements and the like can be made, without departing from the scope of the claims appended hereto.

The invention claimed is:

1. An antenna apparatus for use in a non-contact type IC card into and from which data can be written and read by electronic apparatuses having a communication function, by virtue of inductive coupling, the antenna apparatus comprising:

a loop coil produced by winding a conductive wire in a plane and configured to perform the inductive coupling; and a magnetic member covering one region of the loop coil, provided at one side thereof, from one surface of the loop coil, passing through the loop coil, and covering another region of the loop coil, provided at the other side thereof, from the other surface of the loop coil, wherein the loop coil in entire region thereof is covered by the magnetic member from either the one surface side or from the other surface side of the magnetic member.

2. The antenna apparatus according to claim 1, wherein the one surface of the loop coil is a region for communication with the electronic apparatus, and the other surface at which the loop coil is covered with the magnetic member has an area larger than that of the one surface at which loop coil is covered with the magnetic member.

3. The antenna apparatus according to claim 1, wherein the one surface of the loop coil is a region for communication with the electronic apparatus, and a winding which the loop coil has at the other side is broader than a winding which the loop coil has at the one side.

4. The antenna apparatus according to claim 1, wherein the one surface of the loop coil is a region for communication with the electronic apparatus, and winding turns which the loop coil has at the other side are arranged at longer intervals than winding turns which the loop coil has at the one side.

5. The antenna apparatus according to claim 1, wherein the magnetic member has a first part covering one region of the loop coil, provided at the one side thereof, from the one surface, a second part covering the other region of the loop coil, provided at the other side thereof, from the other surface, and an insertion part passing through an insertion hole made in the loop coil and coupling the first part and the second part, and the one surface of the loop coil, which is not covered with the magnetic member, is a region for communication with the electronic apparatus.

6. The antenna apparatus according to claim 5, wherein the insertion part of the magnetic member is narrower than the first and second parts.

7. The antenna apparatus according to claim 6, wherein the first part and the second part are broader than the loop coil.

8. The antenna apparatus according to claim 7, wherein the one surface of the loop coil is a region for communication with the electronic apparatus, and the other surface at which the loop coil is covered with the magnetic member has an area larger than that of the one surface at which the loop coil is covered with the magnetic member.

9. The antenna apparatus according to claim 8, wherein the one surface of the loop coil is a region for communication with the electronic apparatus, and a winding which the loop coil has at the other side is broader than a winding which the loop coil has at the one side.

10. The antenna apparatus according to claim 8, wherein the one surface of the loop coil is a region for communication with the electronic apparatus, and winding turns which the loop coil has at the other side are arranged at longer intervals than winding turns which the loop coil has at the one side.

11. The antenna apparatus according to claim 5, wherein the first part and the second part are larger than the loop coil.

* * * * *

UNITED STATES PATENT AND TRADEMARK OFFICE
CERTIFICATE OF CORRECTION

PATENT NO. : 7,503,509 B2  Page 1 of 1
APPLICATION NO. : 11/660560
DATED : March 17, 2009
INVENTOR(S) : Aramaki et al.

It is certified that error appears in the above-identified patent and that said Letters Patent is hereby corrected as shown below:

ON THE PATENT COVER SHEET

At field (86) PCT No., please replace "PCT/JP2006/012067" with

"PCT/JP2006/312067" so that the corresponding sentence reads

--(86) PCT No.:  PCT/JP2006/312067--

Signed and Sealed this

Twenty-first Day of April, 2009

JOHN DOLL
*Acting Director of the United States Patent and Trademark Office*